United States Patent [19]

Fukui

[11] Patent Number: 4,633,838

[45] Date of Patent: Jan. 6, 1987

[54] METHOD AND SYSTEM FOR CONTROLLING INTERNAL-COMBUSTION ENGINE

[75] Inventor: Toyoaki Fukui, Kyoto, Japan

[73] Assignee: Mitsubishi Jidosha Kogyo K.K., Tokyo, Japan

[21] Appl. No.: 723,125

[22] Filed: Apr. 15, 1985

[30] Foreign Application Priority Data

Apr. 13, 1984 [JP] Japan .................................. 59-74603
Mar. 19, 1985 [JP] Japan .................................. 60-54823

[51] Int. Cl.$^4$ ............................................. F02B 3/00
[52] U.S. Cl. ................................. 123/488; 123/494; 123/480
[58] Field of Search ...................... 123/494, 488, 480

[56] References Cited

U.S. PATENT DOCUMENTS

| | | | |
|---|---|---|---|
| 4,263,884 | 4/1981 | Suzuki | 123/494 |
| 4,455,985 | 6/1984 | Asayama | 123/494 |
| 4,457,281 | 7/1984 | Ueyama | 123/494 |
| 4,499,881 | 2/1985 | Takao | 123/494 |
| 4,527,530 | 7/1985 | Abe | 123/494 |
| 4,549,513 | 10/1985 | Douaud | 123/488 |

Primary Examiner—Ronald B. Cox
Attorney, Agent, or Firm—Sughrue, Mion, Zinn, Macpeak & Seas

[57] ABSTRACT

A method and apparatus for controlling operating conditions of an internal combustion engine based upon sensed operating parameters of the engine expressed in the form of pulse signals, wherein the frequency of the pulses is representative of the sensed parameter. The pulse intervals of the sensed operating parameter signals are measured to the fractional level before being stored and employed by a CPU to calculate data applied to control predetermined operating conditions of the engine, such as the fuel flow rate and the ignition timing. The inventive method and apparatus attain greater operating stability for steady-state operations and excellent response under transient conditions of the engine.

30 Claims, 12 Drawing Figures

METHOD AND SYSTEM FOR CONTROLLING INTERNAL-COMBUSTION ENGINE

BACKGROUND OF THE INVENTION

The present invention relates to a method and a system for controlling an internal-combustion engine, and more particularly, to a method and a system utilizing appropriate informations from sensors used to detect the operating parameter of the engine for engine controlling purposes.

Heretofore, there have been employed methods of controlling an internal combustion engine including steps of obtaining necessary data for use in controlling the engine by providing various data indicative of operating parameters of the engine in the form of electric signals with the use of sensors, making calculations based on the detected signals using a digital computer, and controlling the fuel flow rate ignition timing, etc., of the engine based on such data.

The fuel flow rate is normally controlled according to the flow rate Q of intake air as detected by an intake air flow rate sensor, corrected according to various temperature conditions including engine temperature, exhaust gas condition, engine speed, and rate of acceleration. The corrected value is utilized to operate an electromagnetic fuel injection valve.

The ignition timing control is effected by: determining as a base data value the spark advance angle (angle of lag from a reference crank angle) based on the engine load P, as detected by a steady-state engine load sesor, and the engine speed N, detected by an engine speed sensor; (it is also possible to determine the value of Q/N from the output of an intake flow rate sensor and the engine speed N from the engine speed sensor); calculating an ignition advance value (angle of lag from a reference crank angle) by correcting the base data value according to the engine temperature and the amount of knocking of the engine; measuring the actual crank angle lag (from the reference crank angle); and generating sparks upon coincident of the actual crank angle with the ignition advance data value.

. To carry out the calculations mentioned above, a digital computer is used, employing an operating program. Execution of the operating program can be carried out continuously and repetitively, or the program can be executed each time a predetermined trigger pulse is produced. Each time the program is executed, then-present input values corresponding to the data of the various operating parameters are employed by the program, the input values being stored at designated addresses.

The various input values must, of course, be supplied to the computer in digital form. This necessitates conversions into digital form of base signals in various forms. If the base value is in the form of a resistance, for instance, in the case of detecting the engine temperature using a thermistor or in the case of detecting the intake air flow rate from variations in the resistance of a potentiometer controlled in position by the angle of a flap arranged in an intake pipe, a voltage level must first be adjusted before being subjected to analog-to-digital conversion. If the base value is in the form of a signal having a pulse frequency corresponding to the particular operating condition, as in the case of, for instance, detecting the intake air flow rate by detecting Kalman vortices downstream of a vortex-generating pillar arranged in an intake pipe, or in the case of detecting the engine speed with a pickup provided adjacent a rotary disc driven by the crankshaft, it is necessary to detect the period or frequency of the base signal such as with a timer or the like.

Figure 3:
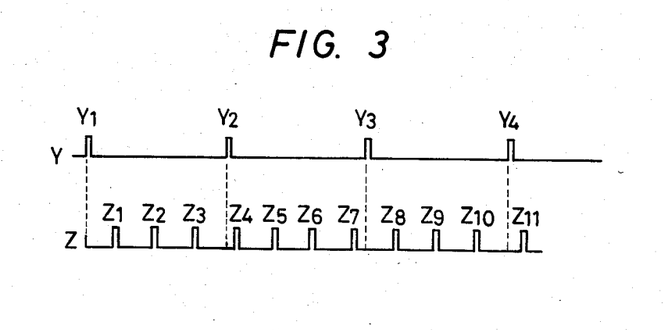
FIG. 3 is a timing chart exemplifying the generation of trigger and pulse signals.

Detecting data of operating parameters from the state of a pulse signal (an output signal of pulses) having a frequency corresponding the respective sensed operating parameter of the engine is generally superior in accuracy to detection based on a change in resistance. However, there is a disadvantage in that, when counting numbers of pulses produced within a fixed measuring interval, the end of the measuring intervals may not coincide with the trigger signal used to start the execution of the operating program. For example, assuming that the trigger signals are generated at predetermined crank angles or time intervals as shown at Y in FIG. 3 and a pulse signal having a frequency corresponding to an operating condition such as the intake air flow rate or engine speed are as shown at Z in FIG. 3, if the engine operating conditions are steady, the pulse signal contains pulses occurring at substantially equal intervals, although the interval may fluctuate slightly. However, because there is no integer relationship between the frequencies of the pulse and trigger signals, three pulses of the pulse signal are generated in the measuring interval between the trigger signal pulses Y1 and Y2, four pulses of the pulse signal are generated between the trigger signal pulses Y2 and Y3, and three pulses of the pulse signal are generated between the trigger signal pulses Y3 and Y4. If the input value is determined according to the number of pulse signal pulses generated within these measuring intervals, although the actual parameter is constant, the input values will fluctuate. If the fuel flow rate and ignition timing are calculated using input values varying depending on the measuring interval, a constant fuel flow rate and ignition timing will not be obtainable, consequently resulting in irregularity of engine operation.

Although it is possible to obtain input values from the mean values of the pulse intervals of such pulse signals obtained over several measuring intervals, doing so makes it impossible to obtain accurate data of operating conditions in transitional states such as during periods of acceleration. Also, the responsiveness of the system in controlling the fuel rate and the ignition timing is decreased, resulting in an unsatisfactory engine performance.

SUMMARY OF THE INVENTION

In view of the foregoing, an object of the present invention is to provide a method and an apparatus for controlling an interval-combustion engine, wherein data of operating parameter in both cases of steady-state and transitional operation is accurately converted to operational input values so that precise and accurate operational control over the engine is maintained at all times.

An apparatus of the invention for controlling an internal-combustion engine has a sensor for detecting the data of an operating parameter of the engine, which sensor produces an output signal of pulses having frequency corresponding to the data of the respective operating parameters. Computing means receives the result detected by the sensor, and using this value computes controlling data used to directly control predetermined operating conditions of the engine. The value applied to the computing means are based on individual trigger signal periods of a trigger signal which is asynchronous with the pulse signals. In accordance with the invention, the apparatus is further provided with means for measuring numbers of pulses of the output signal; means for measuring interval between each pulse of the trigger signal and the last pulse of the output signal prior to the pulse of the trigger signal; means for converting the result measured by the means for measuring the pulse interval to a number of pulses of the output signal; means for computing respective input values based on the result converted by the means for converting; and means for computing data indicative of the predetermined operating conditions in response to the input value, the input value computing means operating synchronously with respect to the trigger signal.

Further, an apparatus in accordance with the present invention may include: a sensor for detecting the data of predetermined operating parameter of an internal-combustion engine and producing an output signal of pulses having a frequency corresponding to the data of this operating parameter; means for producing a trigger signal which is asynchronous with the occurrence the pulse of the output signal; first means for measuring the number of pulses of the output signal produced between two timewise-contiguous trigger signal pulses; second means for measuring the interval between a trigger signal pulse and the last pulse of the output signal prior to the trigger signal pulse; means for converting the result measured by the second means to number of pulses of the output signal; means for storing results converted by the converting means; means for computing the input value corresponding the data of the operating parameter for each trigger signal pulse based on the result measured by the first measuring means, the result measured by the second measuring means and the data stored by the means for storing the converted result; means for computing controlling data for controlling predetermined operating conditions of the engine based at least on the computed input value, the means for storing the result converting receiving the converted result that has been used when the input value computing means has computed the input value.

A method of the invention for controlling an internal-combustion engine includes steps of detecting with a sensor the data of a predetermined operating parameter of the engine and producing an output signal of pulses having a frequency corresponding to the detected data; and computing controlling data for controlling a predetermined operating condition of the engine based at least on an input value corresponding to the data of the predetermined operating parameter for each pulse of a trigger signal asynchronous with the occurrence of the pulse of the output signal, wherein the improvement comprises, when a plurality of pulses of the output signal are produced between timewise-contiguous trigger signal pulses, the input signal used for subsequent computation is given by the following equation (2), and, when only a single pulse signal pulse is produced between timewise-adjacent trigger signal pulses, the input signal used for subsequent computation is given by the following equation (3), and, when no pulse is produced between timewise-adjacent trigger signal pulses, the input signal used for subsequent computation is given by the following equation (4) ($\tau_1+\tau_2 \leq \tau_3$) or equation (5) ($\tau_1+\tau_2 > \tau_3$):

$$A_n + T_1/T_2 - T_3/T_4, \tag{2}$$

where, $A_n$: number of pulses of the output signal generated between timewise-adjacent trigger signal pulses;

$T_1$: interval between a trigger signal pulse and the last pulse of the output signal prior to that trigger signal pulse;

$T_2$: interval between a pulse of the output signal related to $T_1$ above and the last pulse signal pulse prior to the pulses of the output signal related to $T_1$ above;

$T_3$: interval between the last trigger signal pulse prior to the trigger signal pulse related to $T_1$ above and the last pulse of the output signal prior to the last trigger signal pulse of the trigger signal pulse; and $T_4$: interval between the pulse of the output signal related to $T_3$ above and the last pulse of the output signal prior to the pulse of the output signal related to $T_3$ above;

$$1 + t_1/(t_2+t_3) - t_3/t_4 \tag{3}$$

$t_1$: interval between the single pulse of the output signal and the next subsequent trigger signal pulse;

$t_2$: interval between the single pulse of the output signal and the last trigger signal pulse prior to the single pulse of the output signal;

$t_3$: interval between the last trigger signal pulse prior to the single pulse and the last pulse of the output signal prior to the single pulse; and $t_4$: interval between the last pulse of the output signal related to $t_3$ above and the last pulse signal pulse prior to the last pulse of the output signal;

$$\tau_1/\tau_3 \tag{4}$$

$$1 - \tau_2/\tau_3 \tag{5}$$

$\tau_1$: interval between a trigger signal pulse and the immediately preceding trigger signal pulse;

$\tau_2$: interval between the immediately preceding trigger signal pulse related to $\tau_1$ and the last pulse of the output signal prior to that trigger signal pulse; and $\tau_3$: interval between the pulse of the output signal related to $\tau_2$ and the last pulse of the output signal prior thereto.

In the apparatus according to the present invention in which data based on the interval between the time a pulse of the output signal is produced and the time of the next subsequent trigger signal pulse is converted to a number of pulses of the output signal, the accuracy and stability of the input data used to compute the operating conditions controlling data is greatly improved, and hence the operation of the engine is more accurately controlled with an improved responsiveness.

Further, in a control method according to the present invention in which the trigger signal pulses define the limits of the measuring intervals of the pulse signal, when a pulse of the output signal occurs in a measuring interval, an operational input value is obtained based on the number of pulses of the output signal and the interval between the last pulse of the output signal and the trigger signal pulse, and when no pulse signal pulse occurs in a measuring interval, the operational input value is obtained based on the interval between the last pulse of the output signal and a trigger signal pulse. Accordingly, the same advantages as mentioned above are obtained.

DESCRIPTION OF THE PREFERRED EMBODIMENTS

Referring now to the accompanying drawings, a preferred embodiment of the present invention will be described in detail.

Figure 1:
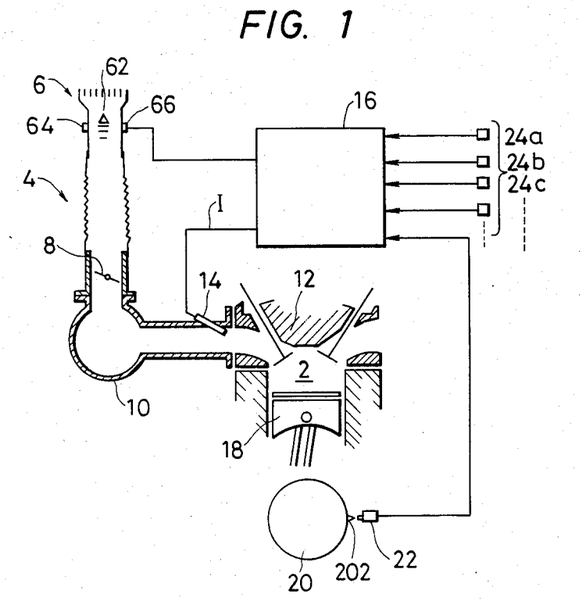
FIG. 1 is a schematic diagram illustrating the construction of an electronically controlled fuel injection system to which the present invention is applicable.

FIG. 1 illustrates a multi-cylinder internal-combustion engine equipped with an electronically controlled fuel injection system. The engine is provided with a Kalman vortex air flow meter 6 mounted close to the intake port of an intake path 4 for conducting intake air into each combustion chamber 2, and a throttle valve 8 located downstream from the Kalman vortex air flow meter 6 in the intake path 4, the throttle valve 8 being operated interlockingly with the accelerator pedal operated by the driver. The intake path 4 on the downstream side of the throttle valve 8 communicates with the connection path portion of an intake manifold 10, each branch path of the intake manifold 10 communicating with the intake port of each cylinder head 12, the latter being communicated with each combustion chamber 2 through a valve.

An electromagnetic fuel injection valve 14 is arranged close to each intake port of each branch path of the intake manifold 10, which constitutes a fuel supply regulating means, one of the means which controls the operating condition of the engine. One end of this valve 14 communicates with each branch path of the intake manifold 10, and the other is designed to open and shut the opening at one end of a fuel path (not shown) communicating with a fuel tank (not shown) through a pump and a fuel pressure regulator (not shown). Constantly pressurized (low pressure) fuel is always supplied to the end of the fuel path, that end being positioned opposite to where the fuel pressure regulator is located, by the action of the pump and the fuel pressure regulator, and the fuel within the fuel path is injected into each branch path of the intake manifold 10 when the valve member (not shown) of the electromagnetic fuel injection valve 14 is released by an injector driving signal I applied from a control unit 16. The quantity of fuel injected into each branch path is proportional to the release time (opening period) of the electromagnetic fuel injection valve 14. That is, the release time of the electromagnetic fuel injection valve 14 is corresponding to the controlling data of the electromagnetic fuel injection valve 14, which acts as another device for controlling the operating condition of the engine.

A piston 18 partitioning the combustion chamber 2 is coupled to a crankshaft 20, which is provided with a boss 202 for detecting when the shaft is in a predetermined rotational phase. A pickup 22 including an electromagnetic coil is arranged close to the crankshaft 20 and, when the boss 202 passes by the pickup 22 while rotating simultaneously with the crankshaft 20, a voltage associated with change in the magnetic flux of the pickup 22 is generated and an a.c. voltage signal derived therefrom is applied to the control unit 16, thus indicating the rotational phase of the crankshaft 20. In other words, the combination of the boss 202 and the pickup 22 serves as a crank phase sensor for detecting the rotational phase of the crankshaft 20, producing a signal at a desired rotational phase. That is, the combination of the boss 202 and the pickup 22 further serves as a phase sensor for detecting a phase during the operating cycle of the internal-combustion engine and produces a signal at a desired phase. The a.c. voltage signal produced in the pickup 22 is subjected to waveform shaping by the waveform shaping circuit of the control unit 16 before being converted to a rectangular pulse signal C. The rectangular pulse signal C (hereinafter called the "crank pulse signal C") functions as a trigger signal, as described later, for determining a timing at which an controlling data computing means starts operations and the electromagnetic fuel injection valve 14 is opened.

More specifically, the above-described Kalman vortex air flow meter 6 includes a triangular pillar 62, acting as a vortex generating pillar, perpendicularly arranged in the intake path 4, an ultrasonic wave generator transducer 64 located downstream from the triangular pillar 62 and arranged opposite to the outside wall of the intake path 4, and a pickup unit 66 acting as an ultrasonic wave receiver. In the Kalman vortex air flow meter 6, the ultrasonic waves generated by the transducer 64, dependent on the action of the Kalman vortices generated when the intake air passes the triangular pillar 62, are subjected to amplitude and frequency modulation before being received by the pickup 66. In the signal received by the pickup 66, the modulation frequency (envelope component) is extracted as the high-frequency component is removed by a waveform shaping circuit including a low-pass filter in the control unit 16. Thus, an a.c. voltage signal having the same frequency as the Kalman vortices is generated, that is, an a.c. voltage signal having a frequency proportional to the air flow rate is obtained.

The a.c. voltage signal is converted by a pulse generating circuit in the control unit 6 to a signal K (hereinfter called the "Kalman vortex signal K") to a square pulse train synchronous with that frequency. In this embodiment of the present invention, the Kalman vortex air flow meter 6 equipped with the triangular pillar 62, the transducer 64 and the pickup 66, and waveform shaping and pulse generating circuits in the control unit 16 for converting the output signal of the Kalman vortex air flow meter 6 to a pulse signal (train) constitutes a sensor for detecting data of the intake air flow rate, one of the sensed parameters of the internal-combustion engine, providing a pulse signal having a frequency corresponding to the data of the intake air flow rate.

Such a method of obtaining a pulse signal having a frequency corresponding to the data of the intake air flow rate from the output signal of the Kalman vortex air flow meter 6 has previously been disclosed in Japanese Patent Publication No. 58-6050 corresponding (U.S. Pat. No. 4,235,205).

Moreover, the control unit 16 is also so arranged as to receive other operating parameters, including parameters on engine temperature, intake air temperature, opening amount of the throttle valve 8, r.p.m. of the engine, oxygen concentration in the exhaust gas, etc. from sensors 24a, 24b, 24c, etc. As for the data on the r.p.m. of the engine, such may be obtained by measuring pulse intervals (frequency) of the crank pulse signal C mentioned above and taking the reciprocal of the measured results. Processes such as waveform shaping and A/D conversion can be employed as the occasion demands for respective input data in the control unit 16.

Figure 2:
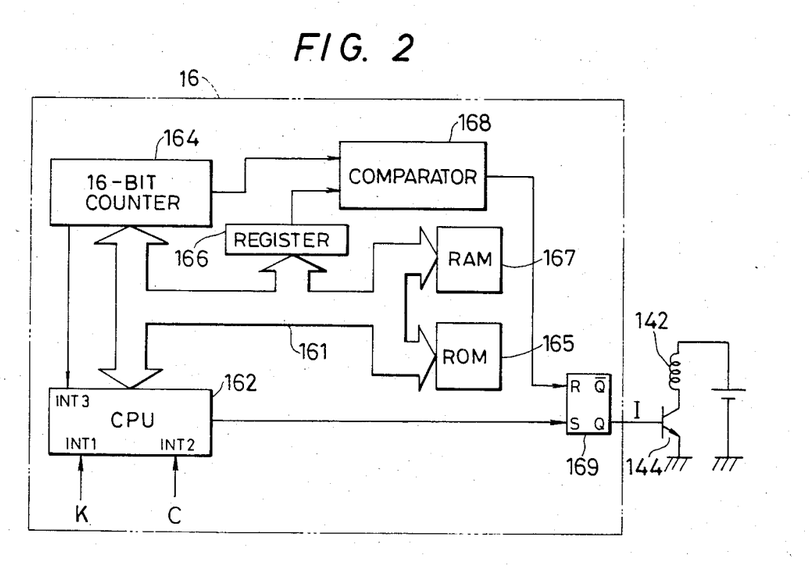
FIG. 2 is a block diagram descriptive of a control unit used with the invention.

As shown in FIG. 2, the control unit 16 is provided with, in addition to an interface having circuits for the above-described waveform shaping, pulse generation and A/D conversion, a free-running counter 164 operated by a clock signal, a ROM 165, a RAM 167 and a CPU 162 connected thereto through a bus 161. Operational programs to be executed in the CPU 162 and basic data for use in them are stored in the ROM 165, whereas the results detected by the sensors 24a ... and those computed by the CPU 162 are stored in the RAM 167. The control unit 16 is further provided with a register 166 used for determining fuel injection terminating timing and a comparator 168 for comparing data from the register 166 with the value given by the free-running counter 164 and producing an output signal when the two values are equal.

The CPU 162 has three external interrupt terminals INT 1, INT 2 and INT 3 to which the Kalman vortex signal K, the crank phase signal C and the overflow signal of the counter 164, respectively, are applied. In the CPU 162, various programs stored in the ROM 165 are executed depending on the presence or absence of an interrupt signal on each terminal. Moreover, as the value of the free-running counter 164 is always receivable by the CPU 162 through the bus 161, that value of the counter 164 can be received thereby with a prearranged step during the execution of various programs. By this is meant that, each time the values of the free-running counter 164 are read in the CPU 162 on an interrupt signal basis, time intervals at which various interrupt signals are produced, namely, the Kalman vortex signal K or the crank phase signal C, or both, can be measured. Moreover, the CPU 162 furnishes the register 166 with data regarding fuel injection terminating timing and applies a signal to the set terminal of a flip-flop 169 for driving the electromagnetic fuel injection valve 14 with the fuel injection starting timing based on the crank phase signal C. The output signal of the comparator 168 is applied to the reset terminal of the flip-flop 169, and the output signal of the flip-flop 169 is supplied to the base of a switching transistor 144 for controlling the excitation and demagnetization of a solenoid 142 for switching the valve member of the electromagnetic fuel injection valve 14. That is, the output signal of the flip-flop 169 corresponds to the injector driving signal I, whereas the solenoid 142 for switching the valve member is excited only during a period from the application of the fuel injection starting signal from the CPU 162 to the set terminal of the flip-flop 169 up to the application of the output signal of the comparator 168 to the reset terminal of the flip-flop 169, causing the valve member 7 of the electromagnetic fuel injection valve to open, supplying fuel to the intake manifold 10.

However, because the fuel supply required per unit time is generally proportional to the air intake rate, it is sufficient to provide data determining a basic timing interval (driving pulse width) per operation of the electromagnetic fuel injection valve 14 between timewise-adjacent crank phase signal pulses depending on the air quantity taken in when the electromagnetic fuel injection valve 14 is operated in response to a crank phase signal pulse. In this embodiment of the present invention, data concerning the intake air quantity between each combination of adjoining crank phase signals is obtained on the basis of the number of pulses of the Kalman vortex signal generated therebetween, and the aforementioned basic data on valve opening timing is set according to that data.

The operations of the CPU 162 in carrying out operations to set up the above-described basic data of valve opening timing and correcting data based on various engine operating conditions will be described with reference to operational programs shown in flowcharts.

Figure 4A:
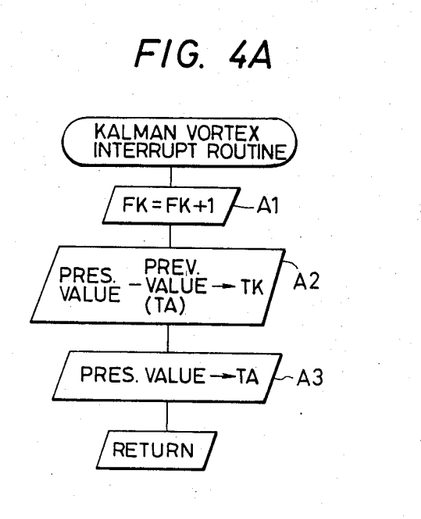
FIG. 4A is a flowchart illustrating a Kalman vortex interrupt routine executed principally by a CPU within the control unit.

FIG. 4A refers to a Kalman vortex interrupt routine to be executed each time a pulse of the Kalman vortex signal K is applied to INT 1. When such a pulse is applied to INT 1, 1 is first added to the data stored at the address FK of the RAM 167 in step A1. Subsequently, the present value of the free-running counter 16 is read in step A2, whereby the difference between the value presently read and what has been read when the program was executed last and written to the address TA of the RAM 167 is obtained and written to the address TK of the RAM 167. In step A3, the value of the free-running counter 164 read during the execution of the present program is written to the address TA above, whereupon program execution is completed, whereby there is provided a stand-by state against interruption by the Kalman vortex signal K. As the program of FIG. 4A is executed each time the Kalman vortex signal K is generated, the integration of the Kalman vortex signal K is seen to have been made in step A1, and thus the number of pulses of the Kalman vortex signal K as a pulse signal is counted in this step. In the step A2, moreover, the time interval between the last Kalman vortex signal pulse and the preceding one is obtained as the difference between values of the free-running counter 164, whereby the pulse interval of the Kalman vortex signal is determined. In the step A2 third means is made up.

When the interrupt process (crank phase interrupt routine) by means of the crank phase signal C is started, the execution of the Kalman vortex interrupt routine is suspended. The execution of the program will be restarted when the interrupt process of the crank phase signal C has been terminated.

Figure 4B:
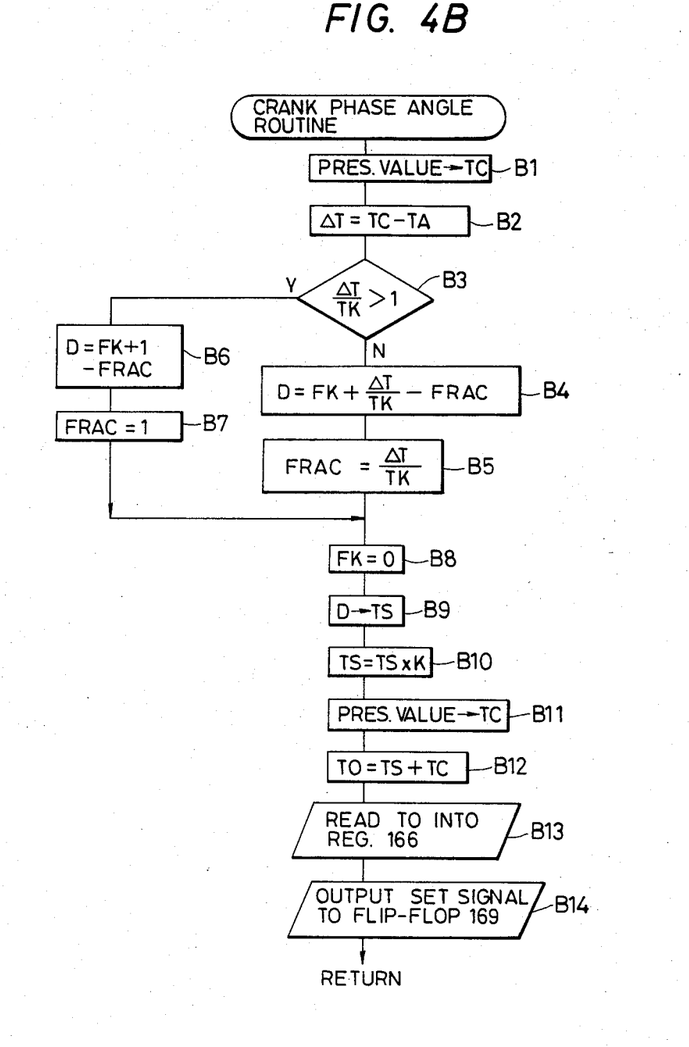
FIG. 4B is a flowchart illustrating a crank phase interrupt routine executed principally by the CPU.

FIG. 4B illustrates a crank phase interrupt routine executed each time a pulse of the crank phase signal C is applied to INT 2, wherein, when the crank phase signal C is applied to INT 2, the value of the free-running counter 164 is read in step B1 and inputted to the address TC of the RAM 167. In step B2, subsequently, the difference between the value of the free-running counter 164 at the time the pulse of the crank phase signal C read in the step B1 is produced and that of the free-running counter 164 at the time of generation of the last Kalman vortex signal pule prior to the crank phase signal pulse C written to the address TA previously read in the step A3 of the Kalman vortex interrupting routine is obtained, and this data T is written to the predetermined address of the RAM 167. In step B3, the difference data T obtained in the step A2 is divided by the data obtained in the step A2 of the Kalman vortex interrupt routine and written to the address TK, and the quotient compared with 1 as an upper limit value. If the quotient is less than 1, step B4 will be subsequently performed. In the step B4, the quotient above is added to the data of the number of generated pulses of the Kalman vortex signal obtained in the step A1 of the Kalman vortex interrupt routine and written to the address FK, and the data written to the address FRAC of the RAM 167 is subtracted therefrom. The computed result is written to the address D of the RAM 167. As is obvious from steps B5 and B7 described later, there is written to the address FRAC of the quotient obtained above in the preceding crank phase interrupt routine (hereinafter called the "data of the preceding quotient") or, if the data of the preceding quotient exceeds the upper limit value 1, the upper limit value 1 is written. The address FRAC constitutes the storing means. In the step B5 subsequent to the step B4, the quotient obtained in the step B3 of the present crank phase interrupt routine is written to the address FRAC. The data of the quotient written to the address FRAC in the step B5 is used at the time of operations in the step B4 of the next crank phase interrupt routine and step B6 described later. The step B5 is followed by step B8. On the other hand, if the quotient in the step B3 is found to be greater than the upper limit value 1, the procedure will proceed to the step B6, wherein the upper limit value 1 is added to the data corresponding to the number of Kalman vortex signal pulses which was written to the address FK, and further the data written to the address FRAC is subtracted therefrom, and the computed result written to the address D. The data at the address FRAC in this case is the same as that in the case of step B4. In the step B7 subsequent to the step B6, the upper limit value 1 is written to the address FRAC. The data on the upper limit value written to the address FRAC in the step B7 is used at the time of operations in the steps B4 and B6 of the next crank phase interrupt routine. The step B7 is followed by step B8.

In the step B8, the address FK is reset to reduce the data content thereof to 0, and subsequently data d written to the address D in step B9 is converted to time data $t_s$, corresponding to the release time of the electromagnetic fuel injection valve 14 (drive pulse width), before being written to the address TS of the RAM 16. The relation of $t_s = a \times d$ (where, a is a positive constant) holds between the data d and the time $t_s$, and the value a is stored in a ROM 165. Subsequently in step 10, the data written to the address TS is multiplied by the data written to the address K and the product is again written to the address TS. This data at the address K is designed to correct the opening time of the electromagnetic fuel injection valve 1 in accordance with the engine operating conditions and is computed in the main routine described later. Then, the present count value of free-running counter 164 is again read in step B11 and written to the address TC. (However, the step B11 may be omitted, provided that the operational speed of the CPU 162 is sufficiently high and that the time required from the steps B1 up to B10 is sufficiently short compared with the minimum value of the opening time of the electromagnetic fuel injection valve 14). In step B12, the data at the address TS is added to that at the address TC, and the sum is inputted to the register 16 in step B13. In step 14, a set signal is sent from the CPU 162 to the flip-flop 169, terminating the crank phase interrupt routine, and reaching a stand-by state from which the interrupt routine can be performed again by the next pulse of the crank phase signal C.

Since the data at the address FK is reduced to 0 each time in the step B8 after being written to the address D in the step B4 or B6, the integration of the number of Kalman vortex signal K pulses effected in the step A1 of the Kalman vortex interrupt routine starts with 0 each time a pulse of the crank phase signal C is generated. For this reason, the value of the data at the address FK and written to the address D in the step B4 or B6 in the crank phase interrupt routine at the time of the generation of any crank phase signal pulse is equivalent to the number of Kalman vortex signal K pulses generated during a period from the generation of the last crank phase signal pulse prior to any of the above crank phase signal pulses up to that of any of the above crank phase signal pulses. In other words, the first means is carried out to measure the number of Kalman vortex signal pulses generated between two timewise-adjacent crank phase signal pulses (trigger signal pulses) in the step A1 of the Kalman vortex interrupt routine and in the step B8 of the crank phase interrupt routine.

Moreover, in the crank phase interrupt routine, the content of the free-running counter 164 read in the step A2 of the Kalman vortex interrupt routine and written to the address TA at the time of the generation of the last Kalman vortex signal pulse prior to the crank phase signal pulse is subtracted from the content of the free-running counter 164 read in the step B1 at the time of the generation of the crank phase signal pulse to obtain the difference in the step B2. This corresponds to the measurement of a time interval between the crank phase signal pulse employed as a trigger signal and the Kalman vortex signal pulse (the last pulse signal prior to the crank phase signal pulse). That is, both the pulse interval measuring means and the second means are carried out in the step B2.

In the step B3 of the crank phase interrupt routine, a time interval T(n) between any crank phase signal pulse C(n) obtained in the immediately prior step B2 and the last Kalman vortex signal pulse K(i) prior to the crank phase signal pulse C(n) is divided by a time interval $t_K(i)$ between the Kalman vortex signal pulse K(i) obtained in the Kalman vortex interrupt routine at the time of the generation of the Kalman vortex signal pulse K(i) and written to the address TK and the last Kalman vortex signal pulse K(i−1) prior to the Kalman vortex signal. This means that, as described later, the former data T(n) of the time interval is converted to the number of Kalman vortex pulses. That is, the data ΔT(n) represents the time interval up to the point of time that a crank phase signal pulse C(n) is generated in a time interval $t_K(i+1)$ between the Kalman vortex signal pulse K(i) and the initial Kalman vortex signal pulse K(i+1) following the Kalman vortex signal pulse K(i). Assuming that the intake air flow rate at the time of generation of the Kalman vortex signal pulse K(i) up to the generation of the Kalman vortex signal pulse K(i+1) is constant, since the data $t_K(i+1)$ of the time interval corresponds to the data 1 related to the number of vortices, the data value obtained by dividing ΔT(n) by $t_K(i+1)$ will be equivalent to what is obtained by converting the data of the time interval between the Kalman vortex signal K(i) and the crank phase signal pulse C(n), and, assuming further that $t_k(i)$ and $t_k(i+1)$ are equal, the division of $\Delta T(n)$ by $t_k(i)$ is equivalent to the conversion of the time interval data $\Delta T(n)$ into the number of Kalman vortex pulses. In the step B3, accordingly, the time interval between the crank phase signal pulse (trigger signal pulse) and the Kalman vortex signal pulse (the last pulse signal pulse prior to the crank phase signal pulse) is converted to the number of Kalman vortex signal pulses. In converting the data $\Delta T(n)$ to the number of Kalman vortex signal pulses, $t_k(i)$ is assumed equal to $t_k(i+1)$ and, in case the quotient obtained by dividing $\Delta T(n)$ by $t_k(i)$ exceeds 1, the reliability of the quotient is assumed to be extremely low because $\Delta T(n)$ should never exceed $t_k(i+1)$. That is, although no Kalman vortex signal pulse is expected to occur between the Kalman vortex signal pulse K(i) and the crank phase signal pulse C(n), the presence of a Kalman vortex signal pulse between both the pulses K(i) and C(n) is shown by the fact that the quotient has exceeded 1. Consequently, whether or not the quotient exceeds 1 is judged in the step B3 and, in case it does not exceed 1, the quotient is added in the step B4, whereas when it exceeds 1, the quotient is replaced with the upper limit value 1 and the upper limit value 1 is added in the step B6.

In the steps B4 and B6 related to the crank phase interrupt routine at the time of the generation of any crank phase signal pulse C(n), the data (upper limit value 1) obtained by converting the time interval between the crank phase signal pulse C(n) and the Kalman vortex signal prior to the crank phase signal pulse C(n) to the number of Kalman vortex signal pulses is added to the number of Kalman vortex signal pulses generated between the crank phase signal pulse C(n) and the last crank phase signal pulse C(n−1) prior to the crank phase signal pulse C(n). In addition, the data (upper limit value 1) obtained by converting the time interval between the crank phase signal pulse C(n−1) and the last Kalman vortex signal pulse prior to the crank phase signal pulse C(n−1) is subtracted therefrom to obtain data indicating the intake air flow rate between the crank phase signal pulse C(n−1) and the crank phase signal pulse C(n), the data obtained being written to the address D.

The following describes the events above on the basis of the generation of crank phase and Kalman vortex signals.

Figure 5:
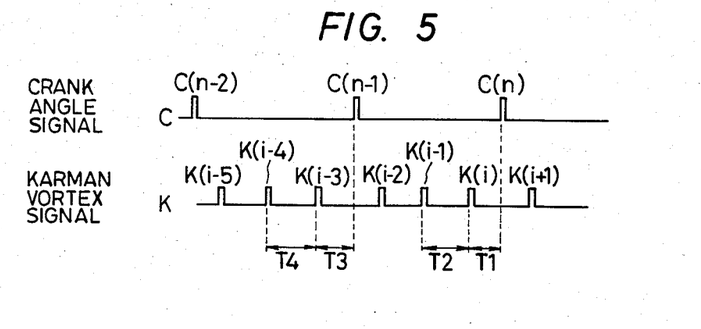
FIGS. 5, 6, 7 and 8 are diagrams descriptive of methods for calculating data of driving conditions according to the present invention.

FIG. 5 illustrates a state wherein a plurality of Kalman vortex signal pulses have been generated between crank phase signal pulses C(n) and C(n−1). In this case, the data written to the address D during the crank phase interrupt routine at the time of generation of any crank phase signal pulse C(n) is given by the following equation (1):

$$A_n + T_1/T_2 - T_3/T_4. \tag{1}$$

In equation (1), $A_n$ represents the number of Kalman vortex signal pulses produced between the crank phase signal pulse C(n) and the last crank phase signal pulse C(n−1) prior to the crank phase signal pulse C(n), $T_1$ the time interval between the crank phase signal pulse C(n) and the last Kalman vortex signal pulse K(i) prior to the crank phase signal pulse C(n), $T_2$ the time interval between the Kalman vortex signal pulse K(i) and the last Kalman vortex signal pulse K(i−1) prior thereto, $T_3$ the time interval between the crank phase signal pulse C(n−1) and the last Kalman vortex signal pulse K(i−3) prior thereto, and K4 the time interval between the Kalman vortex signal pulse K(i−3) and the last Kalman vortex signal pulse K(i−4) prior thereto. Since $a_n = 3$ according to FIG. 5, the data written to the address D in the crank phase interrupt routine at the time of generation of the crank phase signal pulse C(n) actually becomes:

$$3 + T_1/T_2 - T_3/T_4. \tag{1'}$$

"3" in the equation (1') was shifted from K(i−3) to K(i−2), 1 was counted and then shifted from K(i−2) to K(i−1), and 1 was added to make 2. It was further shifted from K(i−1) to K(i), and 1 was added to make 3. The term $+T_1/T_2$ in the equation (1') corresponds to the number of Kalman vortex signal pulses contained in the time interval between C(n) and K(i), and the time interval between K(i−1) and K(i) is assumed equal to that between K(i) and K(i+1). The term $-T_3/T_4$ in the equation (1') corresponds to the subtraction of the number of Kalman vortex signal pulses contained in the time interval between C(n−1) and K(i−3); in this case, the time interval between K(i−4) and K(i−3) is also considered equal to that between K(i−3) and K(i−2). Consequently, the number of Kalman vortex signal pulses occurring from C(n−1) to C(n) is seen to have been calculated to an accuracy of a fractional value according to the equation (1').

Figure 6:
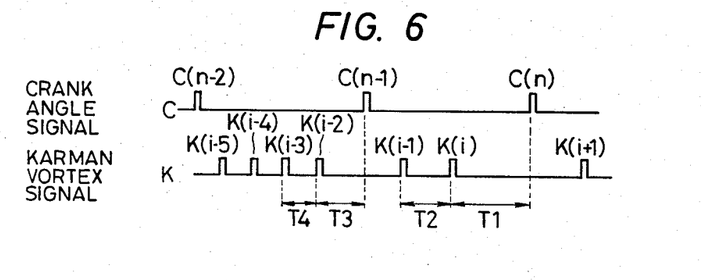

As is evident from the equation (1) and FIG. 5, the values of $+T_1/T_2$ and $-T_3/T_4$ were employed because $T_1 \leq T_2$ and $T_3 \leq T_4$, but in the case of $T_1 > T_2$ or $T_3 > T_4$, the upper limit value 1 is substituted for the calculated value $T_1/T_2$ or $T_3/T_4$ to effect the calculation of the number of Kalman vortex signal pulses. As shown in FIG. 6, for instance, in case $T_1$, $T_2$, $T_3$, $T_4$ have the relationship $T_1 > T_2$ and $T_3 > T_4$ for any crank phase signal pulse C(n), the number of Kalman vortex signal pulses occurring between the crank phase signal pulse C(n) and the last crank phase signal pulse C(n−1) prior thereto, that is, the data written to the address D in the crank phase interrupt routine at the time of generation of the crank phase signal pulse C(n), becomes $A_n = 2$, $T_1/T_2 \rightarrow 1$, $T_3/T_4 \rightarrow 1$, and is thus given as $2 + 1 - 2 = 2$.

Figure 7:
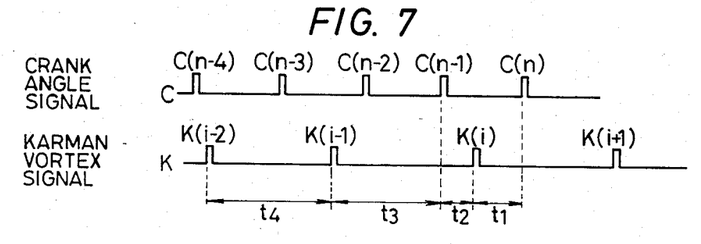

Referring to FIG. 7, a description will subsequently be given of a case where one Kalman vortex signal pulse is produced between a given crank phase signal pulse C(n) and the last crank phase signal pulse C(n−1) prior thereto.

In this case, is is assumed that $t_1$, $t_2$, $t_3$, and $t_4$ in FIG. 7 are respectively as follows:

$t_1$: time interval between a Kalman vortex signal pulse K(i) occurring between crank phase signal pulses C(n) and C(n−1);

$t_2$: time interval between a Kalman vortex signal pulse K(i) and the crank phase signal pulse C(n−1);

$t_3$: time interval between the crank phase signal pulse C(n−1) and the last Kalman vortex signal pulse K(i−1) prior thereto; and $t_4$: time interval between the Kalman vortex signal K(i−1) and the last Kalman vortex signal pulse K(i−2) prior thereto.

When $t_3 \leq t_4$, the number of Kalman vortex signal pulses occurring between the crank phase signal pulse C(n−1) and the crank phase signal pulse C(n), that is, the data written to the address D in the crank phase interrupt routine at the time of generation of the crank phase signal pulse C(n), is obtained from the following equation (2):

$$1 + t_1/(t_2+t_3) - t_3/t_4. \quad (2)$$

"1" in equation (2) was shifted from K(i−1) to K(i) and defined as 1. The term $t_1/(t_2+t_3)$ in the equation (2) represents the number of Kalman vortex signal pulses in the time interval between K(i) and C(n). In this case, the time interval between K(i−1) and K(i) is assumed equal to that between K(i) and K(i+1). Moreover, the term $-t_3/t_4$ in the equation (2) signifies the subtraction of the number of Kalman vortex signal pulses contained in the time interval between K(i−1) and C(n−1). In this case, the time interval $t_4$ between K(i−2) and K(i−1) is assumed equal to that between K(i−1) and K(i). According to the equation (2), consequently, the number of Kalman vortex signal K pulses occurring between the crank phase signal pulse C(n−1) and the crank phase signal pulse C(n), that is, the data written to the address D in the crank phase interrupt routine at the time of generation of the crank phase signal pulse C(n), is obtained to an accuracy of a fraction.

In the case of $t_3 > t_4$ in FIG. 7, $t_3/t_4 \to 1$, and the number of Kalman vortex signal pulses is obtainable from the following equation (2'):

$$1 + t_1/(t_2 + t_3) - t_3/t_4 = 1 + t_1/(t_2 + t_3) - 1 = t_1/(t_2 + t_3). \quad (2')$$

Figure 8:
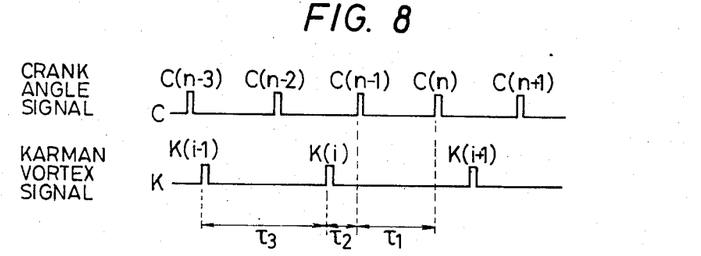

Referring to FIG. 8, a description will be given of the case wherein no Kalman vortex signal pulse occurs between the crank phase signal pulse C(n) and the last crank phase signal pulse C(n−1) prior thereto. In this case, it is assumed that $\tau_1$, $\tau_2$ and $\tau_3$ of FIG. 8 are as follows:

$\tau_1$: time interval between the crank phase signal pulse C(n) and the crank phase signal pulse C(n−1);

$\tau_2$: time interval between the crank phase signal pulse C(n−1) and the last Kalman vortex signal pulse K(i) prior thereto; and $\tau_3$: time interval between the Kalman vortex signal pulse K(i) and the last Kalman vortex signal pulse K(i−1) prior thereto.

The number of Kalman vortex signal pulses is given by the following equation (3) for $\tau_1 + \tau_2 \leq \tau_3$, and for $\tau_1 + \tau_2 > \tau_3$, the number of Kalman vortex signal pulses is given by the following equation (4):

$$\tau_1/\tau_3, \quad (3)$$

$$1 - \tau_2/\tau_3 \quad (4)$$

According to the equations (3) and (4) above, the number of Kalman vortex signal pulses between the crank phase signal pulse C(n−1) and the crank phase signal pulse C(n), that is, the data written to the address D in the crank phase interrupt routine at the time of generation of the crank phase signal pulse C(n), is obtained to an accuracy of a fraction.

The data of the number of Kalman vortex signal pulses obtained in the steps B4 and B6 of the crank phase interrupt routine as described above is converted into data controlling the electromagnetic fuel injection valve (14) opening time (driving pulse width) in the step B9, and is further corrected in accordance with the engine operating conditions in the step B10. In the steps B9 and B10, the electromagnetic fuel injection valve 14 regulating rate or opening time (driving pulse width) is computed based on input data corresponding to the intake air flow rate, and the regulating rate calculated above is employed in the steps B9 and B10. The operation of the electromagnetic fuel injection valve 14 is started by a set signal produced from the CPU 162 in the step B14 of the crank phase interrupt routine and applied to the flip-flop 169. In other words, the electromagnetic fuel injection valve 14 operates each time a pulse of the crank phase signal C (as a trigger signal) is produced. The electromagnetic fuel injection valve 14 opening time (driving pulse width) at the time of the generation of any crank phase signal pulse is set by the operations carried out in the crank phase interrupt routine of the steps B9 and B10 at the time of the generation of the crank phase signal pulse.

Figure 4C:
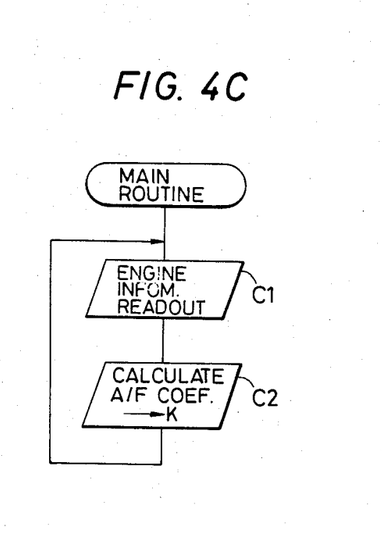
FIG. 4C is a flowchart illustrating a main routine executed principally by the CPU.

FIG. 4C shows a main routine repeatedly executed while the interrupt process using interrupt signals such as the Kalman vortex signal and crank phase signal is not being carried out in the CPU 162. Data stored in the RAM 167 from each of the sensors 24, etc., is read out in step C1, and subsequently A/F (Air/Fuel) correction coefficients are obtained through operations in step C2, the correction coefficient being used for controlling the A/F to make it rich when a heavy load is applied, during warm-up, and times of acceleration, and to make it lean when a partial load is applied, at times of deceleration, etc. The coefficient obtained is written to the address K of the RAM 167, whereupon the procedure is returned to the step C1 again. The main routine causes the execution of the program to be suspended when an interrupt signal pulse occurs, and the execution of the program is restarted after the interrupt process has terminated. The A/F correction coefficient written to the address K in the step C2 of the main routine is, as aforementioned, used in the step B10 of the crank phase interrupt routine.

In the above arrangement, the CPU 162 computes, if a crank phase signal pulse C(n) is produced, data related to the intake air flow rate in the time period between the crank phase signal pulse C(n−1) and the crank phase signal pulse C(n) based on the number of actual Kalman vortex signal pulses in that interval, data obtained by converting the time interval between the crank phase signal phase C(n) and the last Kalman vortex signal pulse prior thereto to a number of Kalman vortex signal pulses, and data obtained by converting the time interval between the crank phase signal pulse C(n−1) and the last Kalman vortex signal pulse prior thereto to a number of Kalman vortex signal pulses. Further, the CPU 162 computes data indicative of the electromagnetic injection valve 14 opening time (driving pulse width) when the valve 14 is driven synchronously with the crank phase signal based on the above-described data. The data of the valve opening time is converted into time data before being inputted to the register 166. Then, the electromagnetic fuel injection valve 14 is released and fuel is injected into the intake manifold 10 during the period from the time at which the CPU 162 produces the set signal of the flip-flop 169 until the computer 168 generates the reset signal of the flip-flop 169 upon coincidence between the actual time outputted from the free-running counter 164 and the time data above.

In the above-described embodiment of the invention, accordingly, fuel injection is made synchronous with the generation of the crank phase signal pulses and is accomplished in such a manner that the quantity of fuel injected for any crank phase signal pulse is based on the intake air quantity between the occurrence of the phase signal pulse C(n) and the last crank phase signal pulse C(n−1) prior thereto. Moreover, as the intake air quantity data is measured highly accurately, the supply of fuel in a suitable quantity is obtained, and excellent engine performance during conditions of heavy load, acceleration, deceleration, and normal engine operation provided. Moreover, since the quantity of fuel injected is constant for constant operating conditions, stable engine operation is assured.

In the above-described embodiment of the present invention, as the a.c. voltage signal generated when the boss 202 attached to the crankshaft 20 passes the pickup 22 is used as a trigger signal, injection is made twice per operating cycle in a four-stroke internal-combustion engine wherein one operating cycle is completed by two revolutions of the crankshaft. However, the shaft, or rotor of a distributor rotating at a speed half that of the crankshaft 20, may be provided with, for instance, a sensor for detecting the rotational phase angle thereof, producing a phase signal at a desired rotational phase for use as a trigger signal. In this case, injection once per operating cycle in a four-stroke internal-combustion engine can be obtained.

If a signal containing pulses generated at a predetermined rotational phase is used as a trigger signal when injection once per operating cycle is employed, the injection valves of the cylinders of a multi-cylinder engine will be simultaneously opened. On the other hand, by detecting the rotational phase of a rotary shaft rotating at a speed half that of the crankshaft 20 at m places in an internal-combustion engine having m cylinders, fuel injection can be made at an optimum timing for each cylinder. That is, in such a case, the rotary shaft is provided with a projection or the like at m places and pulses are produced whenever any of the projections passes a fixed-position pickup. The signal so generated has k bits ($k > \log_2 m$) to distinguish which one of the projections has generated a particular pulse. Based on the k-bit signal, the CPU distinguishes which cylinder should receive fuel. When a pulse is produced, for instance, from the first projection, fuel is injected into the first cylinder. The fuel injection timing is successively controlled so that, when a pulse is produced from the j-th ($J \leq m$) projection, fuel is injected into the j-th cylinder.

In the arrangement above, when the electromagnetic fuel injection valve opening time (driving pulse width) in each cylinder is determined, the above-described crank phase interrupt routine is carried out only when a pulse produced from a particular one of the projection occurs, but injection for each of the cylinders is carried out for pulses from each of the projections synchronously with the pulses produced thereby. The amount of fuel injected for all cylinders is determined in the single interrupt routine carried out for all cylinders when the pulse generated from the one projection occurs. It is possible, however, to execute an interrupt routine for each of the m pulses per revolution. In this case, there are prepared m addresses (excluding addresses TA, TK and K) of the RAM 167 used in the crank phase interrupt routine for each cylinder so that m independent crank interrupt routines are executed. In this case, the j-th crank phase interrupt routine is executed using the address for the j-th cylinder each time a pulse from the j-th projection (for releasing the injection valve of the j-th cylinder $j = 1, 2 \ldots m$) is generated, and the amount of fuel to be injected is determined individually for each cylinder. When different injection timing is provided for each cylinder in this manner, it is preferred to provide for each cylinder a separate register 166, comparator 168 and flip-flop 169.

In the case of FIG. 4B, although only the data indicative of the valve opening time (driving pulse width) obtained from the crank phase interrupt routine at the time of generation of a desired crank phase signal pulse is used to determine the injection valve shut-off timing inputted to the register 166, the injection valve shut-off timing may further be based on particular operating conditions. For instance, when the engine is rotating at a high speed, the shut-off time may be based on the last data obtained at the valve opening time (driving pulse width) and data obtained earlier.

Figure 9:
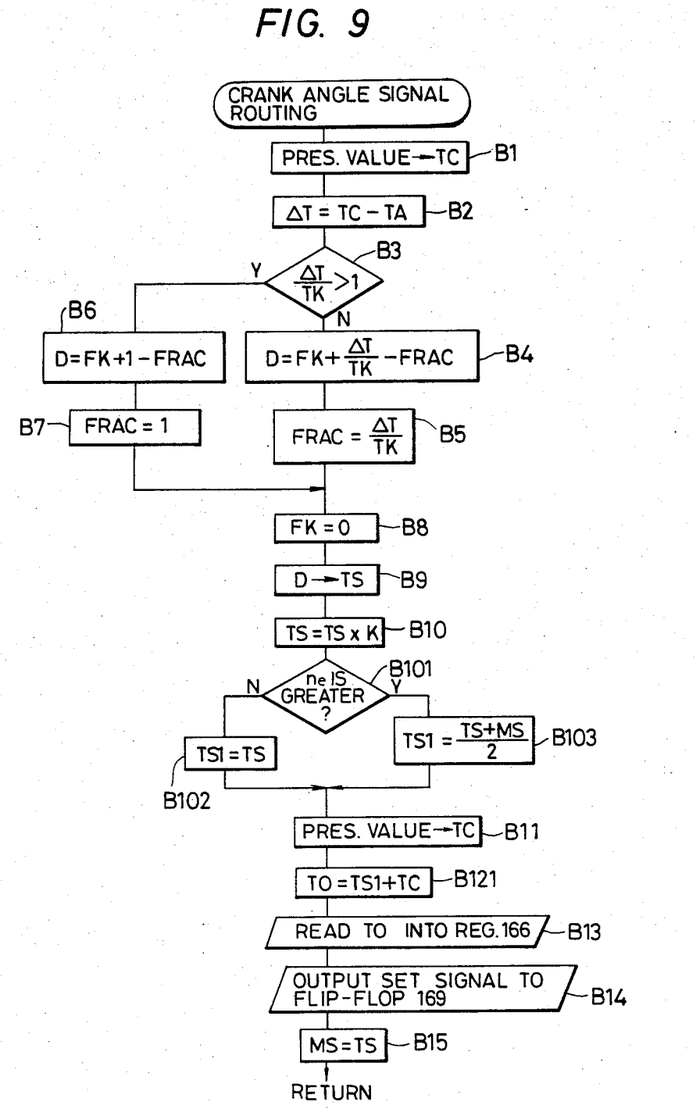
FIG. 9 is a flowchart illustrating a modified example of a crank phase interrupt routine.

FIG. 9 illustrates a modified example of the crank phase interrupt routine which may be employed in such a case. Here, after valve opening time data (driving pulse width) has been obtained in the step B10, as in the case of the crank phase interrupt routine of FIG. 4B, and corrected depending on the engine operating conditions, engine speed data $n_e$ is read in a step B101. It is then determined whether $n_e$ is greater than a set engine speed. If $n_e$ is lower than the set engine speed in the step B101, the data at the address TS will be written to the address TS1 of the RAM 167 in step B102 and the procedure proceeds to step B11. On the other hand, in case $n_e$ is found to be greater than the set engine speed in the step B101, the data at the address TS and the mean value of the data at the address MS will be written to the address TS1 in step B103 and the procedure will proceed to the step B11. At this time, data at the address TS is to be written to the address MS in step B15, as described below. That is, in step B103 of a desired crank phase interrupt routine, there is obtained the mean value of the data written to the address TS in the step B10 of the desired crank phase interrupt routine and the data written to the address TS in the step B10 of the last crank phase interrupt routine prior to the desired crank phase interrupt routine. The data of the mean value is then written to the address TS1.

In the step B11 after the termination of the process in the step B102 or B103, the content of the free-running counter 164 is read and written to the address TC, and, as in the case of FIG. 4B, the data at the address TS1 is added to that at the address TC to compute the total in step 121. Then, the same process as that of FIG. 4B is effected in steps B13 and B14 and the data at the address TS is written to an address MS in step B15. At this point, the crank phase interrupt routine is completed.

In the modified embodiment of FIG. 9, when the rotational speed of the engine is low, the injection valve shut-off timing data (hereinafter called the "desired valve shut-off time data") to be inputted to the register 166 at the generation of any crank phase signal pulse in the same manner as that of FIG. 4B is determined using only the valve opening time data (hereinafter called the "desired valve opening time data") obtained through operations in the crank interrupt routine at the time of the generation of any crank phase signal pulse. On the other hand, when the rotational speed of engine is high, the desired valve shut-off time data is set as the mean value of the desired valve opening time data and the valve opening time data obtained through operations in the crank phase interrupt routine at the time of the generation of the last crank phase signal pulse prior to the desired crank phase signal pulse. The effect is that the actual quantity of fuel injected is stable when the engine is rotating at high speed, even if a CPU is employed whose operational speed is not high.

Of the steps shown in FIG. 9, those identified by like reference numerals in FIG. 4B have the same or substantially the same contents as those of the respective steps of FIG. 4B.

Although description has been given of a method of controlling the fuel quantity supplied to an internal-combustion engine equipped with an electromagnetic fuel injection valve, the present invention is also applicable to ignition timing control wherein the ignition timing is controlled.

Figure 10:
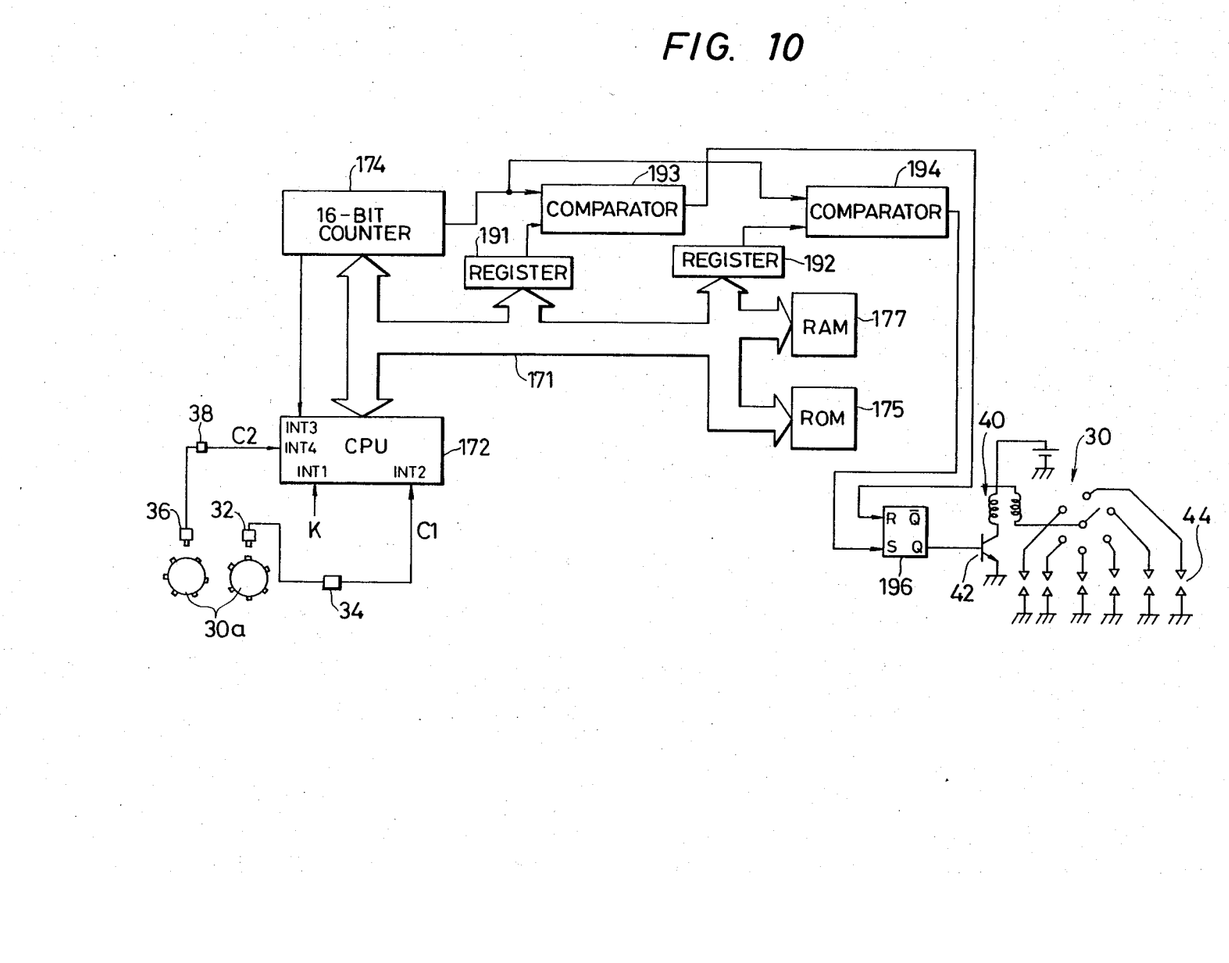
FIG. 10 is a schematic diagram illustrating the construction of the principal part of an ignition timing control device.

In such a case, as illustrated in FIG. 10, a CPU 172 is employed having four external interrupt terminals. The same Kalman vortex signal K as that of FIG. 2 is applied to the terminal INT 1, and a signal obtained by detecting a first boss train provided on the rotor shaft 30a of a distributor 30 using a pickup 32 and shaping the resulting output into rectangular pulse signal in a waveform shaping circuit is applied to the terminal INT 2 as a signal C1. To the terminal INT 3, an overflow signal is applied from the free-running counter 174, as in the case of FIG. 2, and, to the terminal INT 4, a signal obtained by detecting a second boss train provided on the rotor shaft 30a using a pickup 36 with the resulting output shaped into rectangular pulses in a waveform shaping circuit 38 is applied as a signal C2.

The first boss train is such that bosses in the same number as the engine cylinders are arranged at the equal intervals on the periphery of the rotor 30a. The signal detected by the pickup 32, based on the first boss train, is used as a reference signal for establishing the time at which power is supplied to the primary ignition coil 40. A second boss train is provided on the rotor 30a, out of phase with the first boss train, and having the same number of bosses as the first boss train. The signal detected by the pickups 36 based on the second boss train is used as a reference signal for determining the time at which the supply of power to the primary ignition coil 40 is terminated, that is, the ignition timing of each cylinder. In other words, the same number of interrupt signals as the number of cylinders is applied to the terminals INT 2 and INT 4 per revolution of the distributor (two revolutions of the crankshaft).

Further, the CPU 172 is coupled to a free-running counter 174, a RAM 177, a ROM 175, a first register 191 and a second register 192 through a bus 171. The free-running counter 174 is similar to that of FIG. 2. Operational programs executed by the CPU 172 and basic data used for its operations are stored in the ROM 175, whereas the results detected by the various sensors detecting corresponding engine operating conditions and the operational results from the CPU 172 are stored in the RAM 177, as in the case of the RAM 167 of FIG. 2. There also are provided a first comparator 193 for comparing the data from the first register 191, the output of which sets the ignition timing, with the content of the free-running counter 174 and producing an output signal pulse when the two values are equal, and a second comparator 194 for comparing the data from the second register, the output of which sets the time for starting supplying power to the coil, with the content of the free-running counter 174 and producing an output signal pulse the two values are equal. The output signals of the first and second comparators 193 and 194 are respectively applied to the reset and set terminals of a flip-flop 196. The output terminal of the flip-flop 196 is connected to the base of a switching transistor 42 for controlling the supply of power to the primary ignition coil 40. When an output pulse of the first comparator 193 is produced, the transistor 42 is turned off, causing the current in the primary coil 40 to be cut off, whereas when an output pulse of the second comparator is produced, the transistor 42 is turned on, allowing the current in the primary ignition coil 40 to flow therethrough. A secondary ignition coil 40 is connected to the ignition plugs provided in the combustion chambers of each cylinder through the distributor 30.

In this arrangement, the CPU 172 computes a time lag angle with reference the point of time the signal C1 is generated based on the engine speed, etc., adds the result computed to the content of the free-running counter 174 when a pulse of the signal C1 is produced, and inputs the sum to the register 192. When the value of the register 192 is equal to the content of the free-running counter 174, the comparator 194 provides an input signal pulse to the set terminal of the flip-flop 196 so that power is supplied to the ignition coil 40. Moreover, the timing data corresponding to the lag (i.e., spark advance) from the time the signal C2 is produced is computed from the intake air quantity and engine speed. The computed result is added to the content of the free-running counter 174 when a pulse of the signal C2 is generated, the sum being inputted to the register 191. When the value of the register 191 is equal to that of the free-running counter 174, the comparator 193 supplies an input signal pulse to the reset terminal of the flip-flop 196 to determine the cut-off timing of the transistor 42, that is, the ignition spark generating timing. As in the case of fuel control described above when the intake air quantity data per engine operating cycle is obtained, by counting the number of Kalman vortex signal pulses generated per operating cycle down to fractional levels, it becomes possible to provide ignition timing control offering greater stability for steady-state operations and excellent response characteristics for transitional operating condition.

Although each embodiment of the present invention has been described by taking, as an example, intake air quantity data as the data representing operating parameters detected in the form a pulse signal, the data on the operating parameters may be other data such as engine speed data. When engine speed data is used as the operating parameter data, timing signals at predetermined time intervals are employed as a trigger signal.

According to the present invention, the accuracy in the detection of data on operating parameters is improved because the data is converted to pulse signals and the number of pulses produced within a measuring interval is calculated to fractional values. Thus, by controlling the engine speed on such detected data, it becomes possible to control the engine with greater stability for steady-state operations and to attain excellent response characteristics for transitional operating conditions.

I claim:

1. In a system for controlling an internal-combustion engine having a sensor for detecting data of an operating parameter of the engine and producing an output signal of pulses having a frequency corresponding to the data of said operating parameter, means receiving a result detected by the sensor for computing controlling data based at least on an input value corresponding to the data of an operating parameter for each trigger signal pulse of a period different from that of the output signal, and means receiving said controlling data for controlling an operating condition of said engine according to said controlling data, the improvement wherein said system comprises: means for counting number of pulses of said output signal; means for measuring an interval between a trigger signal pulse and a last pulse of said output signal, prior to said trigger signal pulse; means for converting a result measured by said interval measuring means to number of pulses of said output signal; means for computing said input value based on outputs of said pulse number counting means and said converting means; said input value computing means transmitting said input value to said controlling data computing means synchronously with said trigger signal.

2. The system for controlling an internal-combustion engine as claimed in claim 1, wherein said controlling data computing means computes said controlling data at least based on said input value after having received said input value from said input value computing means when said trigger signal pulse has occurred.

3. A system for controlling an internal-combustion engine comprising: a sensor for detecting data of an operating parameter of said engine and producing an output signal of pulses having a frequency corresponding to the data of said operating parameter; means for producing a trigger signal asynchronous with said output signal; first means for counting number of pulses of said output signal produced between two timewise-adjacent trigger signal pulses produced by said means for producing said trigger signals; second means for measuring an interval between a given trigger signal pulse and a last pulse of said output signal prior to said given trigger signal pulse; means for converting a result measured by said second means to number of pulses of said output signal; means for storing a result converted by said converting means; means for computing an input value corresponding to said data of operating parameter for each trigger signal pulse based on a result measured by said first measuring means, a result converted by said converting means and data stored by said storing means; and means for computing controlling data based at least on said input value, means receiving said controlling data for controlling an operating condition of said engine according to said controlling data said storing means receiving said converted result that has been used when said input value computing means has computed said input value.

4. The system for controlling an internal-combustion engine as claimed in claim 3, wherein said computing means computes said intput value based on an equation (1) in response to a given trigger signal pulse:

$$A_n + B_n - B_{n-1}, \quad (1)$$

where, $A_n$: number of pulse obtained by said first means upon measuring an interval between said given trigger signal pulse and the last trigger signal pulse prior to said given trigger signal pulse;

$B_n$: value obtained by converting a measured result of said given trigger signal pulse by said second means to number of pulses by said converting means; and $B_{n-1}$: value obtained by converting a measured result of said last trigger signal pulse by said second means to number of pulses by said converting means and stored in said storing means.

5. The system for controlling an internal-combustion engine as claimed in claim 4, wherein said converting means comprises third means for measuring an interval at which a pulse of said output signal is produced and means for dividing a result measured by said second means by a result measured by said third means.

6. The system for controlling an internal-combustion engine as claimed in claim 5, wherein said converting means operates in response to data indicative of an interval between a pulse of said output signal used by said second means and a last pulse signal pulse prior to said pulse of said output signal as a measured result produced by said third means when dividing the measured result by the second means for measurement by the third measurement result.

7. The system for controlling an internal-combustion engine as claimed in claim 5 or 6, wherein said converting means comprises means for comparing a converted result with an upper limit value and, when said converted result exceeds said upper limit value, substituting said upper limit value for the divided value.

8. The system for controlling an internal-combustion engine as claimed in claim 7, wherein said upper limit value is 1.

9. The system for controlling an internal-combustion engine as claimed in claim 3, 4, 5, 6, 7 or 8, wherein said controlling data computing means is arranged first to obtain an input value that is computed by said input value computing means on a given trigger signal pulse and to compute the controlling data on said trigger signal pulse basis according to said input value when any trigger signal pulse is produced.

10. The system for controlling an internal-combustion engine as claimed in claim 9, wherein said operation controlling means is arranged to start operation for each of the trigger signals and the controlling data for said operation controlling means when a given trigger signal is produced is set through an operation carried out by said controlling data computing at the time of the generation of said given trigger signal.

11. The system for controlling an internal-combustion engine as claimed in claim 3, 4, 5, 6, 7, 8, 9 or 10, wherein said operating parameter corresponds to the intake air quantity of the internal-combustion engine.

12. The system for controlling an internal-combustion engine as claimed in claim 11, wherein the sensor comprises a pillar provided in the intake path of the internal-combustion engine for generating Kalman vortices and means for detecting said Kalman vortices produced by the pillar and producing a pulse signal corresponding to the generated frequency of the Kalman vortices.

13. The system for controlling an internal-combustion engine as claimed in claim 12, wherein the means for producing a pulse signal comprises an ultrasonic generator located on one side of an intake path downstream from said pillar, an ultrasonic receiver located on the other side of the intake path downstream from said pillar for receiving the ultrasonic waves generated by the ultrasonic generator, and output means for producing a pulse signal based on the modulated state of the ultrasonic wave received by the ultrasonic receiver.

14. The system for controlling an internal-combustion engine as claimed in claim 11, 12 or 13, wherein the means for producing the trigger signal comprises a phase sensor for detecting a phase in the operating cycle of the internal-combustion engine and producing a phase signal in a desired phase, the trigger signal being formed with the phase signal.

15. The system for controlling an internal-combustion engine as claimed in claim 14, wherein the operation controlling means comprises means for regulating fuel supply to the internal-combustion engine.

16. The system for controlling an internal combustion engine as claimed in claim 15, wherein a fuel pipe for feeding fuel pressurized to a predetermined degree is opened to the intake path of the internal-combustion engine, and the means for regulating fuel supply comprises an electromagnetic fuel injection valve provided in a fuel pipe, wherein the controlling data corresponds to the opening period of the electromagnetic fuel injection valve.

17. The system for controlling an internal-combustion engine as claimed in claim 16, where the internal-combustion engine is of a multi-cylinder type, each electromagnetic fuel injection valve being provided for each cylinder, wherein a phase sensor is provided for each cylinder to detect each injection phase for each cylinder, wherein said input valve computing means is arranged to compute the input values individually on said each injection phase basis for each cylinder and obtain the input value on an injection phase basis for each cylinder, wherein the controlling data computing means is arranged to compute the opening period of the electromagnetic fuel injection valve for each injection phase for each cylinder based on the input valve computed on an injection phase basis for each cylinder, wherein the electromagnetic fuel injection valve for each cylinder is arranged to open in the injection phase for each cylinder, and wherein the opening period of the electromagnetic fuel injection valve for any desired cylinder in any given operating cycle is set based on the result from the computation carried out in the injection phase for the desired cylinder in the given operating cycle by the controlling data computing means.

18. The system for controlling an internal-combustion engine as claimed in claim 16, wherein the internal-combustion engine is of a multi-cylinder type, each electromagnetic fuel injection valve being provided for each cylinder, wherein a phase sensor is provided for each cylinder to detect each injection phase for each cylinder, wherein the input value computing means is arranged to compute the input value on said injection phase for a designated cylinder, wherein the controlling data computing means is arranged to compute the opening period of the electromagnetic fuel injection valve for said injection phase, for said designated cylinder based on the input value computed on said injection phase basis for said designated cylinder, wherein the electromagnetic fuel injection valve for each cylinder is arranged to open in said each injection phase for each cylinder, wherein the opening period of the electromagnetic fuel injection valve for said designated cylinder in any given operating cycle is set based on the result from the computation carried out in the injection phase for said designated cylinder in the given operating cycle by the controlling data computing means and wherein the opening period of the electromagnetic fuel injection valve for a cylinder other than said designated one is set based on the result from the computation carried out in the last injection phase for the designated cylinder produced prior to the opening thereof.

19. The system for controlling an internal-combustion engine as claimed in claim 14, wherein the operation controlling means comprises means for regulating ignition timing of the internal-combustion engine.

20. The system for controlling an internal-combustion engine as claimed in claim 11, 12 or 13, wherein there is provided a crank phase sensor for detecting the rotational phase of a crankshaft of the internal-combustion engine and producing a crank phase signal in a desired phase, wherein the trigger signal is formed of the crank phase signal, and wherein the operation controlling means comprises means for regulating fuel supply to the internal-combustion engine.

21. The system for controlling an internal-combustion engine as claimed in claim 20, wherein the fuel pipe for feeding fuel pressurized to a predetermined degree is opened to the intake path of the internal-combustion engine, wherein the means for regulating fuel supply is formed with the electromagnetic fuel injection valve provided in the fuel pipe, and wherein the controlling data corresponds to the opening period of the electromagnetic fuel injection valve.

22. The system for controlling an internal-combustion engine as claimed in claim 3, 4, 5, 6, 7, 8, 9 or 10, wherein said operating parameter corresponds to internal-combustion engine speed data.

23. The system for controlling an internal-combustion engine as claimed in claim 10, further comprising another sensor for detecting a data of another operating parameter than the data of the above operating parameter and another means for storing the computed results from the controlling data computing means, and wherein, in a particular operating condition set up based on the detected results from said another sensor, the controlling data of the operation controlling means at the time of the generation of the desired trigger signal is set based on the data obtained from the computation carried out by the controlling data computing means at the time of the generation of said given trigger signal and the data obtained from the computation carried out by the controlling data computing at the time of the generation of the last trigger signal prior to the desired trigger signal and stored in said another storing means.

24. The system for controlling internal-combustion engine as claimed in claim 23, wherein the data of said operating parameter corresponds to the intake air quantity data, wherein the data of said another operating parameter corresponds to rotational speed data of the internal-combustion engine, and wherein said particular operating condition corresponds to the operating condition of the internal-combustion engine at high speed.

25. A method for controlling an internal-combustion engine employing a sensor for detecting the data of an operating parameter of the internal-combustion engine and producing an output signal of pulses having a frequency corresponding to the data of said operating parameter and means for receiving a result detected by the sensor for computing controlling data of operating condition controlling means of the internal-combustion engine based at least on the input value corresponding to the data of operating parameter for each trigger signal produced with periodicity different from that of the output signal, the improvement comprising, when a plurality of pulses of said output signal are produced between a trigger signal at any given point of time and the last trigger signal prior to that trigger signal, allowing the input data used in the computation made by the controlling data computing means based on the trigger signal at the given point of time to be given by the folloiwng euation:

$$A_n + T_1/T_2 - T_3/T_4, \qquad (2)$$

where,

- $A_n$: number of pulses of said output signal generated between said trigger signal at the given point of time and the last trigger signal prior to said trigger signal at the given point of time;
- $T_1$: interval between said trigger signal at the given point of time and the last pulse of said output signal prior to the trigger signal pulse at the given point of time;
- $T_2$: interval between the pulse of said output signal related to $T_1$ above and the last pulse of said output signal prior to the pulse of said output signal related to $T_1$ above;
- $T_3$: interval between the last trigger signal prior to the trigger signal at the given point of time and the last pulse of said output signal prior to said last trigger signal; and
- $T_4$: interval between the pulse of said output signal related to $T_3$ above and the last pulse of said output signal prior to that pulse of said output signal related to $T_3$ above.

26. The method for controlling an internal-combustion engine as claimed in claim 25, wherein there is provided a phase sensor for detecting a phase in the operating cycle of the internal-combustion engine and producing the pulse phase signal in a desired phase, wherein the trigger signal is formed of the phase signal, wherein the operating condition controlling means is arranged to start operation on a phase signal basis, and wherein the data of said operating parameter corresponds to the intake air data of said operating parameter corresponds to the intake air quantity of the internal-combustion engine.

27. The method for controlling an internal-combustion engine employing a sensor for detecting the data of operating parameter of the internal-combustion engine and producing an output signal of pulses having a frequency corresponding to the data of said operating parameter and means receiving a result detected by the sensor for computing controlling data of operating condition controlling means of the internal-combustion engine based at least on the input value corresponding to the data of an operating parameter for each trigger signal produced with periodicity different from that of the output signal, the improvement comprising, when a single pulse of said output signal is produced between a trigger signal pulse at any given point of time and the last trigger signal pulse prior to that trigger signal pulse, allowing the input data used in the computation made by the controlling data computing means based on the trigger signal at the given point of time to be given by the following equation (3):

$$1 + t_1/(t_2 + t_3) - t_3/t_4 \quad (3)$$

where,

- $t_1$: interval between said single pulse of said output signal and the trigger signal at the given point of time;
- $t_2$: interval between the single pulse of said output signal and the last trigger signal pulse prior to said single pulse of said output signal;
- $t_3$: interval between the last trigger signal prior to the trigger signal at the given point of time and the last pulse of said output signal prior to said last trigger signal; and
- $t_4$: interval between the pulse of said output signal related to $t_3$ above and the last pulse signal pulse prior to the pulse of said output signal related to $t_3$ above.

28. The method for controlling an internal-combustion engine as claimed in claim 27, wherein there is provided a phase sensor for detecting a phase in the operating cycle of the internal-combustion engine and producing the pulse phase in a desired phase, wherein the trigger signal is formed of the phase signal, wherein the operating condition controlling means is arranged to start operation on a phase signal basis, and wherein the data of said operaging parameter corresponds to the intake air quantity of the internal-combustion engine.

29. A method for controlling an internal-combustion engine employing a sensor for detecting the data of operating parameter of the internal-combustion engine and producing an output signal of pulses having a freuqncy corresponding to the data of said operating parameter and means receiving a result detected by the sensor for computing controlling data of operating condition controlling means of the internal-combustion engine based at least on the input value corresponding to the data of operating parameter for each trigger signal produced with periodicity different from that of the output signal, the improvement comprising, when no pulse of said output signal is produced between a trigger pulse at any given point of time and the last trigger signal pulse prior to that trigger signal pulse, allowing the input data used in the computation made by controlling data computing based on the trigger signal at the given point of time to be given by the following equation (4) $(\tau_1 + \tau_2 \leq \tau_3)$ or equation (5) $(\tau_1 + \tau_2 > \tau_3)$:

$$\tau_1/\tau_3 \quad (4)$$

$$\tau_1 - \tau_2/\tau_3 \quad (5)$$

where,

- $\tau_1$: interval between said trigger signal at the given point of time and the last trigger signal prior to said trigger signal at the given point of time;
- $\tau_2$: interval between said last trigger signal related to $\tau_1$ and the last pulse of said output signal prior to said last trigger signal pulse related to $\tau_1$; and
- $\tau_3$: interval between the pulse of said output signal related to $\tau_2$ and the last pulse of said output signal prior thereto.

30. The method for controlling an internal-combustion engine as claimed in claim 29, wherein there is provided a phase sensor for detecting a phase in the operating cycle of the internal-combustion engine and producing the pulse phase signal in a desired phase, wherein the trigger signal is formed of the phase signal, wherein the operating condition controlling means is arranged to start operation on a phase signal basis, and wherein the data of said operating parameter corresponds to the intake air quantity of the internal-combustion engine.

* * * * *